(12) United States Patent
Siegfriedsen

(10) Patent No.: US 8,901,794 B2
(45) Date of Patent: Dec. 2, 2014

(54) SYNCHRONOUS MACHINE

(75) Inventor: Sonke Siegfriedsen, Rendsburg (DE)

(73) Assignee: Aerodyn Engineering, GmbH, Rendsburg (DE)

( * ) Notice: Subject to any disclaimer, the term of this patent is extended or adjusted under 35 U.S.C. 154(b) by 449 days.

(21) Appl. No.: 13/126,373

(22) PCT Filed: Nov. 5, 2009

(86) PCT No.: PCT/DE2009/001567
§ 371 (c)(1),
(2), (4) Date: Apr. 27, 2011

(87) PCT Pub. No.: WO2010/072189
PCT Pub. Date: Jul. 1, 2010

(65) Prior Publication Data
US 2011/0248592 A1 Oct. 13, 2011

(30) Foreign Application Priority Data
Dec. 23, 2008 (DE) .......................... 10 2008 063 045

(51) Int. Cl.
*H02K 1/28* (2006.01)
*H02K 1/27* (2006.01)
*H02K 15/03* (2006.01)
*H02K 7/18* (2006.01)

(52) U.S. Cl.
CPC ............ *H02K 1/2753* (2013.01); *H02K 7/1838* (2013.01); *H02K 7/183* (2013.01); *H02K 15/03* (2013.01)
USPC ............ 310/156.08; 310/156.12; 310/156.15; 310/156.36

(58) Field of Classification Search
USPC .......................... 310/156.01, 156.08, 156.09, 310/156.12–156.15, 156.19, 156.23, 310/156.26, 156.33, 156.36, 156.37, 310/156.47, 269, 156.49
See application file for complete search history.

(56) References Cited

U.S. PATENT DOCUMENTS

| 5,091,668 | A * | 2/1992 | Cuenot et al. ............ 310/156.61 |
| 7,936,102 | B2 * | 5/2011 | Pabst et al. ............... 310/156.12 |
| 2009/0302702 | A1 * | 12/2009 | Pabst et al. ............... 310/156.12 |

FOREIGN PATENT DOCUMENTS

| DE | 19705432 | 8/1998 |
| DE | 102005042543 | 3/2007 |
| EP | 1439626 | 7/2004 |
| JP | 2095150 | 4/1990 |
| JP | 11299147 | 10/1999 |
| JP | 2001025192 | 1/2001 |
| JP | 2004304943 | 10/2004 |

* cited by examiner

*Primary Examiner* — Dang Le
(74) *Attorney, Agent, or Firm* — Diederiks & Whitelaw, PLC

(57) ABSTRACT

A rotor for an electric machine includes a base body and a plurality of support bodies that are fixed on the base body and support permanent magnets. The rotor is characterized in that two first support bodies that are located at a distance from one another form a receiving region for a second support body, allowing the first support body to be positively connected to the second support body.

17 Claims, 6 Drawing Sheets

SYNCHRONOUS MACHINE

CROSS-REFERENCE TO RELATED APPLICATIONS

This application represents a National Stage application of PCT/DE2009/001567 entitled "Synchronous Machine" filed Nov. 5, 2009, pending.

BACKGROUND OF THE INVENTION

1. Field of the Invention

The invention relates to a rotor for an electric machine, e.g. an electricity generator or an electric motor, comprising a base body and a plurality of support bodies that are fixed on the base body and support permanent magnets.

2. Discussion of the Prior Art

The structure of such rotors has been known for a long time. For an equally long period there have been problems concerning fastening the permanent magnets, that are usually bonded to support bodies, on the rotor's base body. For the task of assembly, special safety measures are taken for the personnel, it having to be ensured in particular on account of the considerable magnetic fields produced by the permanent magnets that only non-magnetic materials are introduced into the work rooms and in particular only non-magnetic tools are used. In addition the installation takes place in clean rooms so as to rule out any contamination that could adversely affect the operation of the electric machines to be assembled.

When assembling the permanent magnets on the outer circumference of the rotor's base body the problem exists in particular that magnets arranged on neighbouring support bodies exert strong attractive and repulsive forces on each other and thus make assembly difficult to a considerable extent. During operation of the machine there are also centrifugal forces that act on the support bodies in addition to the magnetic forces, making it necessary to produce an extremely safe and durable connection between the permanent magnets and/or the support bodies and the base body of the rotor.

The connection between the rotor's base body and the support body is usually made by means of a positively locking connection where a groove on the shape of a dovetail is machined in the base body of the rotor, into which a dovetail-shaped pin formed on the base bodies can be introduced. Such designs are for example known from EP 1 439 626 A1 and DE 197 05 432 A1.

Even though this design ensures that the support bodies and thus the permanent magnets fitted thereon can be attached successively by pushing into the groove on the rotor's base body, such that they can be loaded in each case. However the implementation of this connection is very labour consuming and requires a high degree of precision for the necessary manufacturing tolerances to be kept. The manufacture of the rotors is therefore also very cost intensive.

SUMMARY OF THE INVENTION

It is therefore the object of the invention to produce a rotor for an electric machine that can be assembled more easily but just as safely. In particular, the invention relates to a rotor for an electric machine, comprising a base body and a plurality of support bodies that are fixed on the base body and support permanent magnets. The rotor is characterized in that two first support bodies that are located at a distance from one another form a receiving region for a second support body, allowing the first support body to be positively connected to the second support body.

DETAILED DESCRIPTION OF THE DRAWINGS

The invention will now be explained in more detail with reference to a preferred exemplary embodiment illustrated in the drawings, in which.

DETAILED DESCRIPTION OF THE INVENTION

Figure 1:
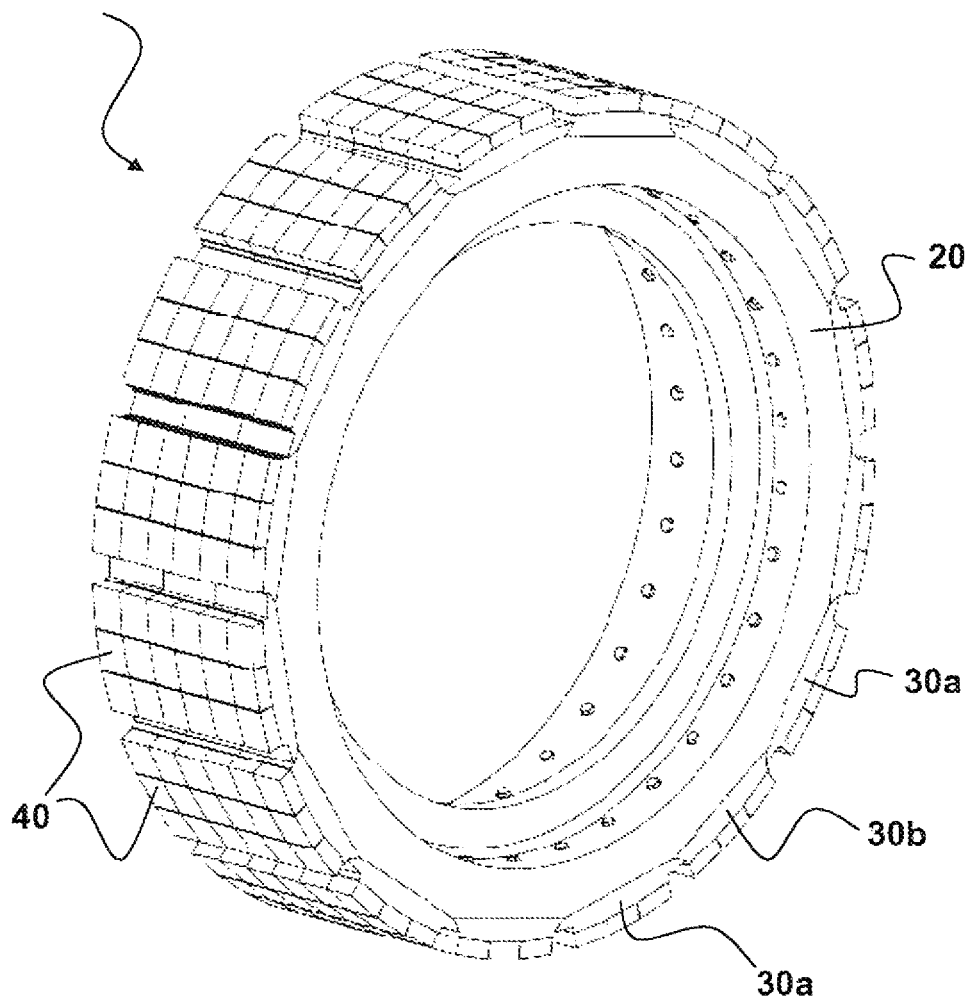
FIG. 1 shows a perspective view of a rotor according to the invention.

Instead of a groove to be milled into base body of the rotor 10, the basic idea of the invention is to shape the support bodies 30a, 30b of the permanent magnets 40 in such a way that the flanges, that face each other, of two first support bodies 30a arranged spaced apart from a receiving region into which a second support body 30b of complementary design to its flanges can be pushed, as a result of which a positive connection between first support bodies 30a and second support body 30b is achieved in the radial direction.

The advantage of attaching to the base body 20 of the rotor 10 two first support bodies 30a that initially are spaced relatively far apart lies in the fact that the attracting and repulsing forces acting between the permanent magnets 40 are minimized in the case of a larger working distance and the support bodies 30a are thus more easy to handle. At the same time work safety is increased.

FIG. 1 shows a rotor of particularly preferable design according to the invention. The rotor 10 exhibits a base body 20 on which the support bodies 30a, 30b that support the permanent magnets 40 are attached. As specified in FIG. 1 the first support bodies 30a are arranged on the circumference of the base body 20 of the rotor 10 so as to alternate with the second support bodies 30b.

Figure 2:
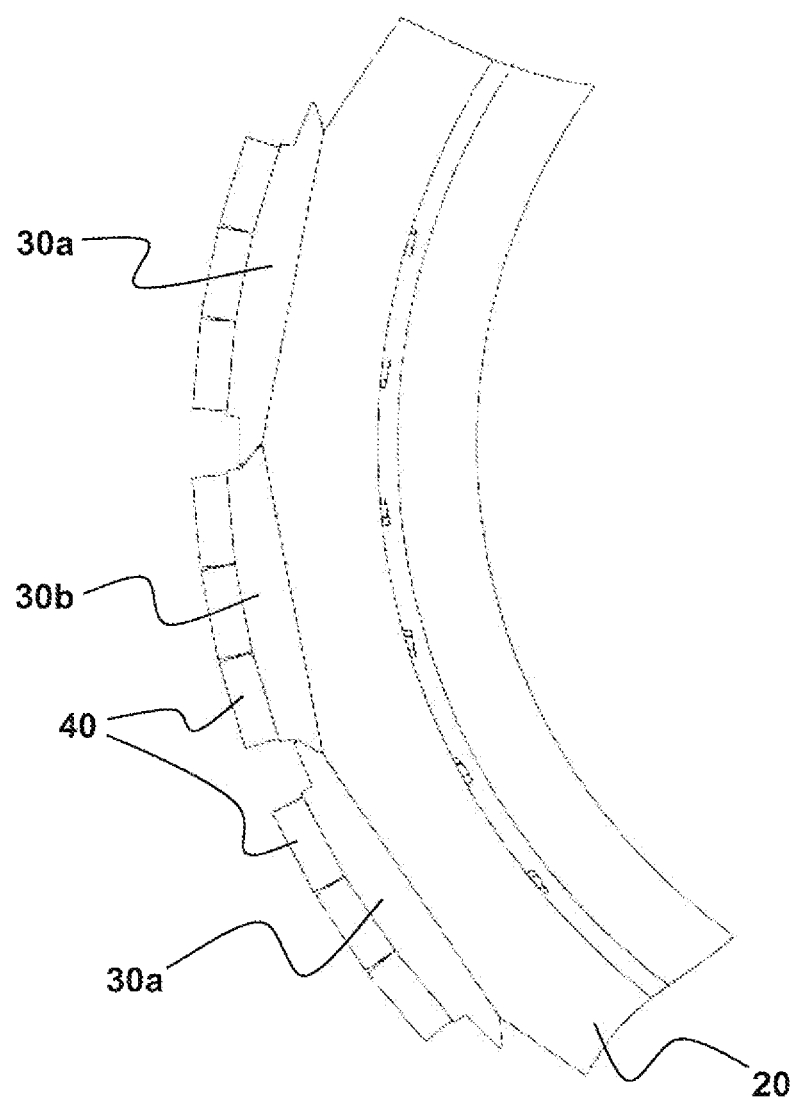
FIG. 2 shows a detail of an axial view of the rotor according to a particularly preferred exemplary embodiment from FIG. 1.
Figure 5:
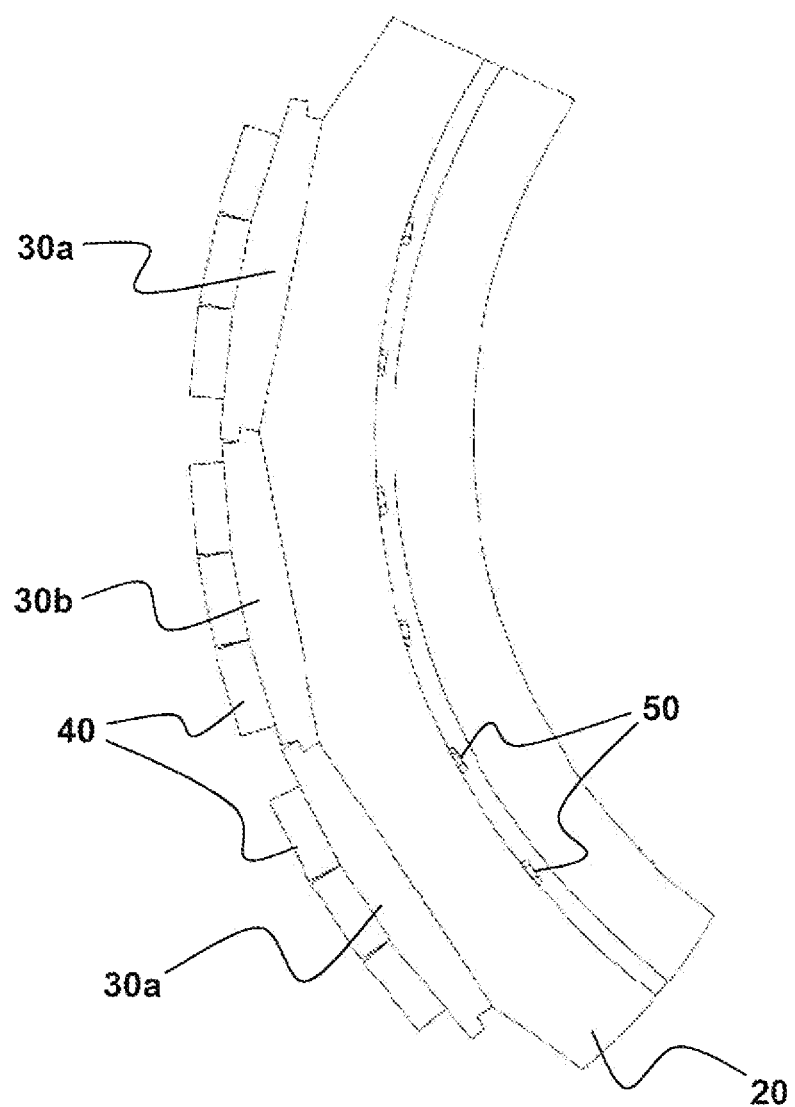
FIG. 5 shows a detail of an axial view of the rotor according to an alternative exemplary embodiment to that shown in FIG. 2.
Figure 6:
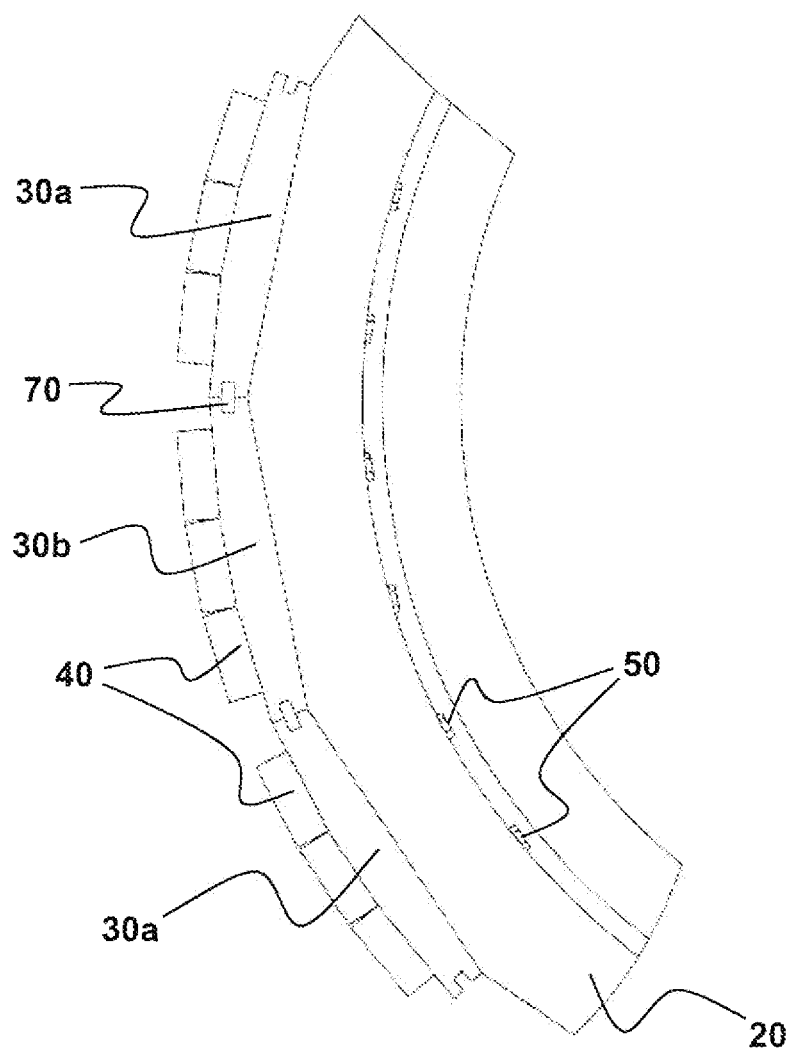
FIG. 6 shows a detail of an axial view of the rotor according to a further alternative exemplary embodiment to that shown in FIG. 2.

The receiving region formed by the first support bodies 30a is preferably of dovetail design—as can be seen in FIG. 2—, the second support body 30b itself being of dovetail shape. As an alternative or in addition the first support bodies 30a and the second support body 30b can have a tongue connection, as it is shown in FIGS. 5 and 6. In the process the tongue connection can also be designed like a tongue and groove connection, an element 70 being preferably introduced into the grooves provided in the (almost) identical support bodies 30a, 30b. Particularly preferably the element 70 is firmly connected either to the first support body 30a or to the second support body 30b.

The first and second support bodies 30a, 30b are preferably shaped with the same overlapping area, the first and second support bodies 30a, 30b being particularly preferably of identical design and the permanent magnets 40 being attached on the first and second bodies 30a, 30b on facing sides.

To this end, the first support bodies 30a can also have a sector-shaped design in cross section and the second support body 30b can be of complementary design thereto.

The second support bodies 30b are pushed into the receiving regions formed by the first support bodies 30a so that the second support bodies 30b are securely held in the receiving region and thus are prevented by the receiving region from yielding to the attractive forces of the first support bodies 30a.

After the second support bodies 30b have been pushed in between the first support bodies 30a that are attached on the base body 20 of the rotor 10 in the axial direction, and secured by a positive connection against being displaced radially, they are additionally immobilized on the base body 20.

Figure 3:
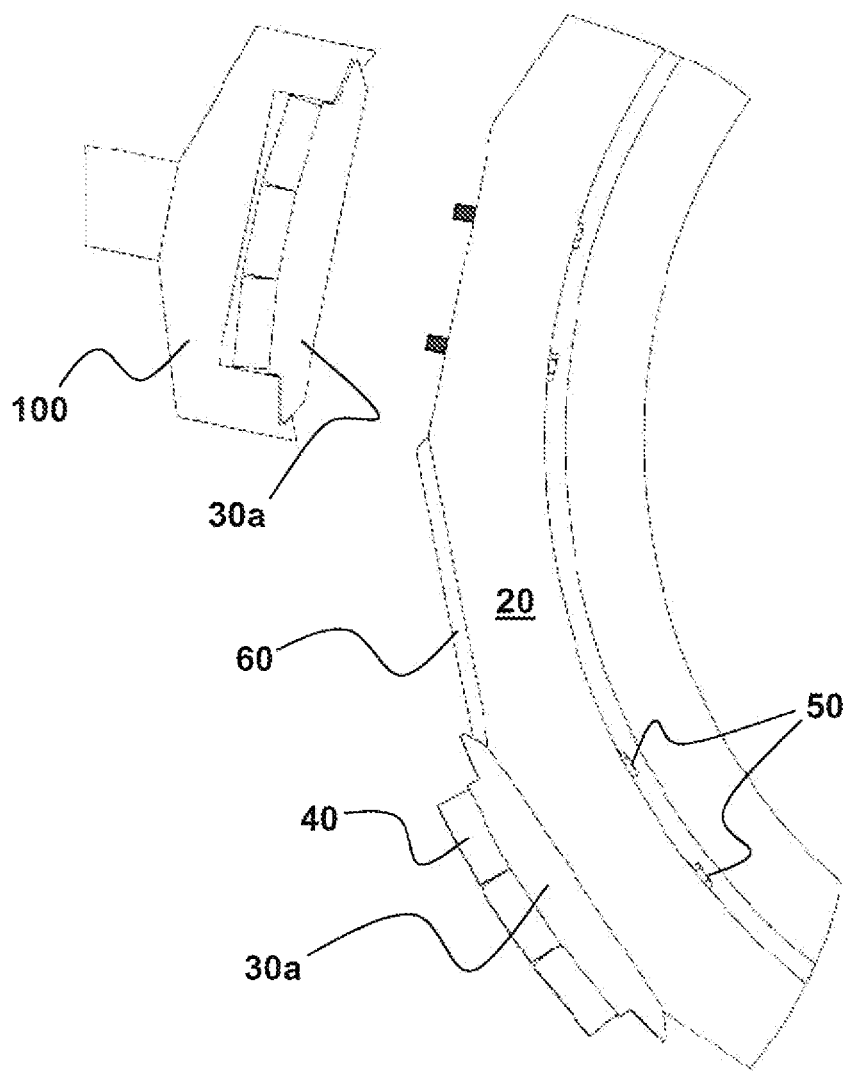
FIG. 3 shows a detail of an axial view during an assembly phase of the rotor from FIG. 1.
Figure 4:
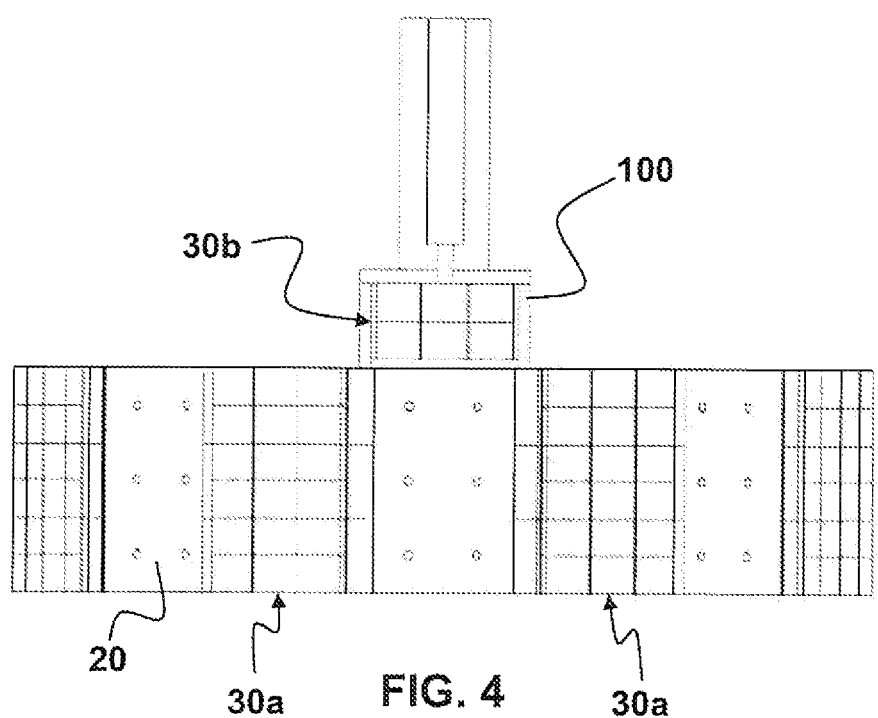
FIG. 4 shows a radial view of the rotor during a further assembly phase.

When assembling the inventive rotor 10 for example for a synchronous generator of a wind turbine, one would proceed as follows, as shown as an example in FIGS. 3 and 4:

Initially at least two first support bodies 30a are brought near to the base body 20 of the rotor 10 using a tool 100 and attached thereto at a spacing relative to each other such that a second support body 30b can be accommodated between the first support bodies 30a. With their flanges that are oriented towards each other, the first support bodies 30a form a receiving region for the second support body 30b.

The second support body 30b is then pushed into the receiving region formed by the first support bodies 30a, the flanges of the second support body 30b being of complementary design to the flanges of the first support bodies 30a, so that in this way a radial positively locking connection takes place between first and second support bodies 30a, 30b that counteracts a radial lifting-off of the second support body 30b.

The second support bodies 30b are preferably fastened directly on the base body 20, e.g. by means of screws.

When the support bodies 30a, 30b are fastened with the base body 20 by means of screw connections 50 there is in particular the possibility, during assembly, of not yet tightening fully the first support bodies 30a, that for example exhibit stud screws (not shown) provided on the support body 30a, on the base body 20 so that a clearance remains initially and thus manufacturing tolerances as large as possible are being made possible when manufacturing the support bodies 30a, 30b. It is not until after the second support bodies 30b have been moved into the receiving region formed by the first support bodies 30a that the first and second support bodies 30a, 30b are brought into their final position by tightening the screw connections 50 without work safety being put at risk.

Then all the steps mentioned are repeated until all first and second support bodies 30a, 30b are attached to the base body 20 of the rotor 10.

As an alternative at first all first support bodies 30a required for a rotor 10 can be attached to the base body of the rotor 10 and then between them the second support bodies 30b are pushed in and immobilized.

It can also be provided that the first and second support bodies 30a, 30b preferably have fastening means designed as (threaded) holes that are arranged differently so that first support bodies 30a differ from second support bodies 30b on account of different "hole patterns". Fastening means 50 can then be inserted into these holes (not shown). This design likewise contributes to increased work safety because of a work sequence with improved structure.

Firmly tightening the support bodies 30a, 30b to the base body 20 of the rotor 10 to form a unit that is firmly interconnected has the further advantage, in addition to the above mentioned aspects relating to the work process, that air-gap losses can be minimized.

Particularly preferably the inventive method is carried out in such a way that at least one place holder 60 (a so called "dummy"; see FIG. 3) is fastened on the base body 20 of the rotor 10 that keeps free the space for the second support body 30b and that is removed after fastening the first support bodies 30a and before introducing the at least one second base body 30b. This guarantees that the first support bodies 30a are fastened at a distance from one another that ensures that a second support body 30b can be pushed in between the first support bodies 30a. To this end the place holder 60 has approximately the same dimensions as the second support body 30b.

However it can also be provided that the place holder has a somewhat larger design than the second support body 30b to account for manufacturing tolerances.

The invention claimed is:

1. A rotor for an electric machine, comprising:
   a base body; and
   a plurality of support bodies fixed on the base body and supporting permanent magnets with each of the permanent magnets being attached on a respective one of the plurality of support bodies, two first support bodies of the plurality of support bodies, located at a distance from one another, form a receiving region for a second support body of the plurality of support bodies, allowing the first support bodies to be positively connected to the second support body, wherein the receiving region formed by the first support bodies has a dovetail shape for accommodating the second support body that exhibits a dovetail-shape in cross section.

2. The rotor according to claim 1, wherein the first and the second support bodies form a tongue connection.

3. The rotor according to claim 1, wherein an area covered by the first and the second support bodies are identical.

4. The rotor according to claim 1, wherein the first and the second support bodies are of identical design, the permanent magnets being fastened on opposite sides of the first and second support bodies.

5. The rotor according to claim 1, wherein the second support body is fastened to the base body using fastening means.

6. The rotor according to claim 1, wherein the first and second support bodies are arranged axially parallel relative to an axis of the base body.

7. The rotor according to claim 1, wherein the first support bodies have a sector-shaped cross section.

8. The rotor according to claim 1, wherein the first and the second support bodies exhibit fastening means that are arranged differently.

9. The rotor according to claim 1, wherein the permanent magnets are located radially outwardly of both the base body and the plurality of support bodies.

10. The rotor according to claim 1, wherein the plurality of support bodies are located radially outwardly of the base body and the permanent magnets are located radially outwardly of the plurality of support bodies.

11. A synchronous generator comprising a rotor including:
    a base body; and
    a plurality of support bodies fixed on the base body and supporting permanent magnets with each of the permanent magnets being attached on a respective one of the plurality of support bodies, two first support bodies of the plurality of support bodies, located at a distance from one another, form a receiving region for a second support body of the plurality of support bodies, allowing the first support bodies to be positively connected to the second support body, wherein the receiving region formed by the first support bodies has a dovetail shape for accommodating the second support body that exhibits a dovetail-shape in cross section.

12. The synchronous generator of claim 11, wherein the permanent magnets of the rotor are located radially outwardly of both the base body and the plurality of support bodies.

13. The synchronous generator of claim 11, wherein the plurality of support bodies of the rotor are located radially outwardly of the base body and the permanent magnets are located radially outwardly of the plurality of support bodies.

14. The synchronous generator of claim 11, wherein the first and the second support bodies form a tongue connection.

15. A method for manufacturing a rotor comprising the following steps:
   a) fastening at least two first support bodies on a base body of the rotor, the first support bodies having flanges that are oriented towards each other, with the flanges forming a receiving region for a second support body to be fastened between the first support bodies, allowing the first support bodies to be positively connected to the second support body, wherein the receiving region formed by the first support bodies has a dovetail shape for accommodating the second support body that exhibits a dovetail-shape in cross section,
   b) introducing the second support body into the receiving region formed by the first support bodies, with flanges of the second support body being of complementary design to the flanges of the first support bodies, and
   c) repeating steps a and b) in fastening additional support bodies to the base body, wherein the rotor includes the base body and a plurality of support bodies, including the first and second support bodies, fixed on the base body and supporting permanent magnets with each of the permanent magnets being attached on a respective one of the plurality of support bodies, while the two first support bodies of the plurality of support bodies are located a distance from one another and form the receiving region for the second support body of the plurality of support bodies, thereby allowing the two first support bodies to be positively connected to the second support body.

16. The method according to claim 15, wherein after insertion into the receiving region, the second support body is immobilized on the base body.

17. The method according to claim 15, further comprising: prior to fastening the first support bodies, fastening at least one place holder on the base body of the rotor that keeps free a space for the second support body and that is removed after fastening the first support bodies and before introducing the second support body.

* * * * *